United States Patent [19]
Hardman et al.

[11] Patent Number: 5,972,408
[45] Date of Patent: Oct. 26, 1999

[54] REDUCED FAT PRODUCT

[75] Inventors: Jane H. Hardman, Akron, Ohio; James Peter Herrick, Brookfield; Timothy Court Jackson, New Milford, both of Conn.; Jeffrey Karl Merchant, Ruffin, N.C.; John Joseph Ophals, Twinsburg, Ohio; Karen G. Tandy, Litchfield, Conn.; William Logan Waymouth, Danville, Va.

[73] Assignee: Nestec S.A., Vevey, Switzerland

[21] Appl. No.: 08/850,980

[22] Filed: May 5, 1997

[51] Int. Cl.⁶ ........................................ A23L 1/39
[52] U.S. Cl. ........................... 426/589; 426/601; 99/348; 99/231
[58] Field of Search .................... 426/589, 601; 99/348, 231

[56] References Cited

U.S. PATENT DOCUMENTS

| | | | |
|---|---|---|---|
| 2,811,452 | 10/1957 | Lesparre | 426/589 |
| 2,909,431 | 10/1959 | Keller | 426/589 |
| 3,245,805 | 4/1966 | O'Neil | 426/589 |
| 3,300,319 | 1/1967 | Marotta | 426/589 |
| 3,652,299 | 3/1972 | Penton | 426/589 |
| 4,126,710 | 11/1978 | Jaworski | 426/589 |
| 4,194,014 | 3/1980 | Hermans | 426/231 |
| 4,196,225 | 4/1980 | Mencacci | 426/523 |
| 4,220,671 | 9/1980 | Kahn | 426/321 |
| 4,597,974 | 7/1986 | Fonteneau | 426/589 |
| 4,746,524 | 5/1988 | Meyer | 426/589 |
| 4,752,487 | 6/1988 | Collyer | 426/321 |
| 4,968,516 | 11/1990 | Thompson | 426/233 |
| 5,102,681 | 4/1992 | Singer | 426/589 |
| 5,221,550 | 6/1993 | Freeman | 426/589 |
| 5,308,637 | 5/1994 | Richards | 426/589 |
| 5,370,896 | 12/1994 | Carter | 426/589 |
| 5,387,428 | 2/1995 | Chapman | 426/589 |
| 5,405,638 | 4/1995 | Huang | 426/589 |

FOREIGN PATENT DOCUMENTS

| | | |
|---|---|---|
| 0012465 | 3/1979 | European Pat. Off. . |
| 0355594 | 8/1989 | European Pat. Off. . |
| 2220125 | 4/1990 | United Kingdom . |
| 2297472 | 7/1996 | United Kingdom . |
| WO98/49907 | 11/1998 | WIPO . |

OTHER PUBLICATIONS

Potter 1973 Food Science 2nd Edition AVI Publishing Co, Inc. Westport CT.
Inglett 1982 Food Products Formulary vol. 4 Fabricated Foods AVI Publishing Co. Inc Westport CT pp. 107–120.
Montagne 1961 Larousse Gastronomique, The Encyclopedia of Food, Wine & Cookery, Crown Publishers Inc, New York pp. 840–863.
McGee 1984 On Food and Cooking Collier Books MacMillan Publishing Co., New York pp. 334–366.
De Veto 1986 Fresh Ways with Pasta Time–Life Books/Alexandria VA p. 58.
Desrosier 1977 Elements of Food Technology p. 23–30.
American Heritage Dictionary of the English Language Third edition 1992 Houghton Mifflin Co. (Electronic version) bearnaise sauce.
Rombauer 1997 Joy of Cooking p.359 A Plume Book New York.
Roller 1996 Handbook of Fat Replacers CRC Press New York pp. 22,23,138,139,238.

*Primary Examiner*—Carolyn Paden
*Attorney, Agent, or Firm*—Pennie & Edmonds LLP

[57] ABSTRACT

A process and an apparatus for the production of a new reduced fat culinary sauce which comprises mixing the ingredients of a reduced fat culinary sauce whereby part of the fat present in a regular culinary sauce is substituted by water, controlling the water activity to a value less than 0.95, mixing or precooking below 160° F. and then processing for a minimum of 0.87 minutes by continuous steam injection and holding at a temperature of at least 160° F.

14 Claims, 1 Drawing Sheet

REDUCED FAT PRODUCT

FIELD OF THE INVENTION

The present invention relates to a reduced fat culinary product and more particularly to a reduced fat sauce as well as a method of preparing it.

BACKGROUND OF THE INVENTION

Some sauces have a high fat content, e.g. pesto sauce normally has a fat content of about 38–40%. As is well known, there is a desire among consumers to reduce their fat intake both for health reasons and for their appearance.

Conventional means of producing commercially practical and cost effective shelf stable reduced fat culinary products typically involve substitution of some of the fat by low cost "filler" ingredients such as water together with the addition of ingredients which help to maintain the textural properties, the functionality and the quality of the corresponding "full-fat" product. Conventional means of producing commercially practical and cost effective non-shelf stable reduced fat culinary products, e.g. refrigerated products, involve either the addition of preservatives, the use of thermal processing treatments or aseptic/clean processing and packaging, or combinations of these techniques.

It is nowadays generally accepted that the use of artificial preservatives is not desired by consumers who, these days, tend to prefer "natural" products. However, in order to achieve a stable refrigerated reduced fat culinary product without adding preservatives, it is usually necessary to use thermal processing methods. The problem with using thermal processing is that the severity of thermal treatment and packaging methods required to achieve enhanced stability have a detrimental effect on the product quality and cost.

SUMMARY OF THE INVENTION

We have now devised a method of producing a reduced fat culinary sauce in the absence of added preservatives and without conventional thermal processing, which has prolonged stability at refrigerated temperatures which comprises substituting part of the oil present in a regular culinary sauce with water, controlling the water activity to a value less than 0.95 and using a minimal thermal process by the application of continuous steam injection processing.

According to the present invention, there is provided a process for the production of a reduced fat culinary sauce which comprises mixing the ingredients of a reduced fat culinary sauce whereby part of the fat present in a regular culinary sauce is substituted by water, controlling the water activity to a value less than 0.95, mixing or precooking below 160° F. and then processing for a minimum of 0.87 minutes by continuous steam injection and holding at a temperature of at least 160° F.

The reduced fat culinary sauce produced by the process of the present invention may be refrigerated or frozen.

DETAILED DESCRIPTION OF THE INVENTION

Figure 1:
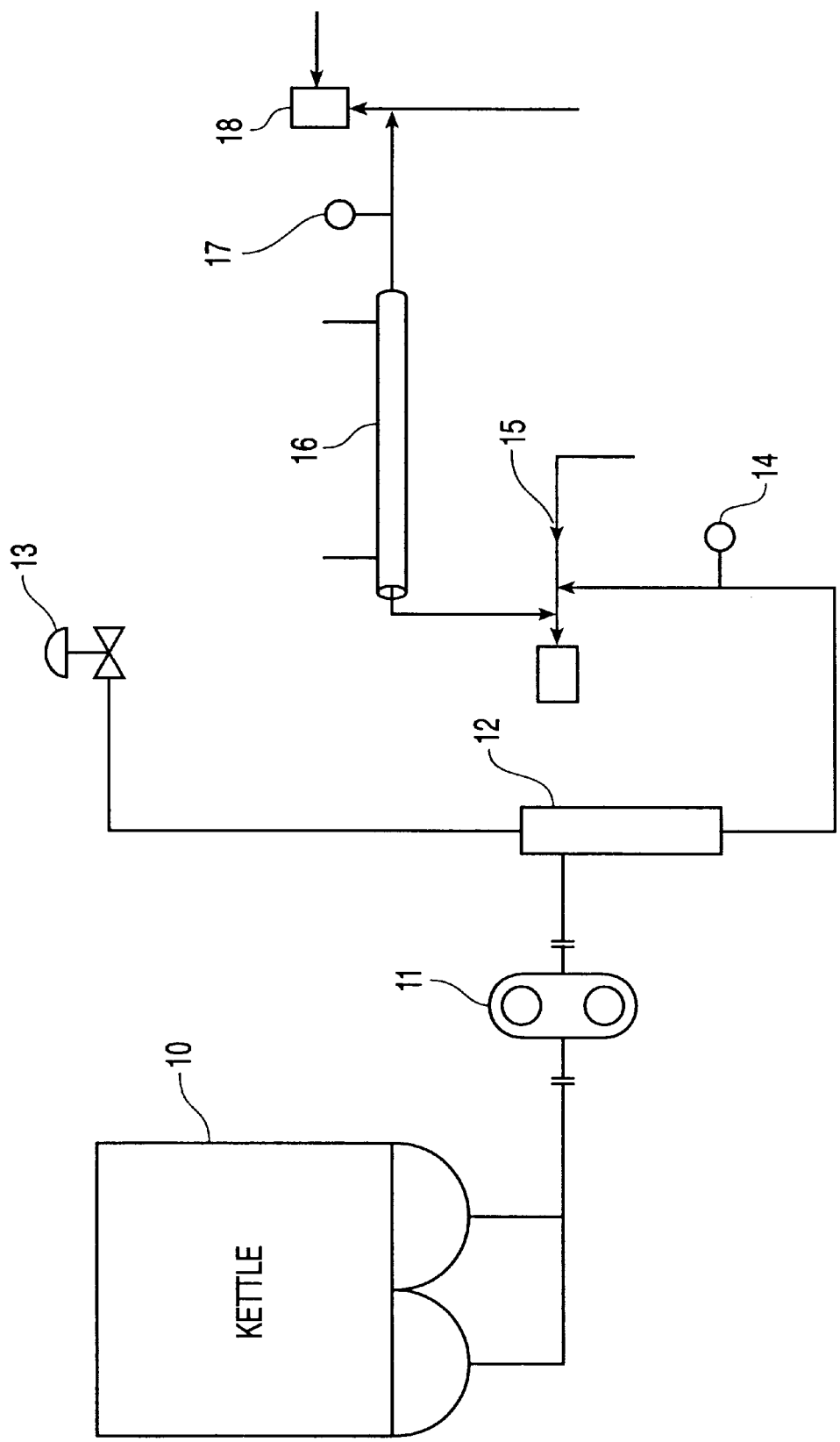
FIG. 1 is a schematic drawing of the process of the present invention.

The amount of fat substituted by water may be from 5 to 50%, preferably from 10 to 40% and more preferably from 20 to 30% by weight of the fat present in the corresponding regular culinary sauce.

The pH of the sauce may vary depending on the water activity and processing conditions. The sauce may be, for example, a low acid sauce having a pH from 4.6 to 6.5, preferably from 5.9 to 6.2 and especially from 6.0 to 6.1, it being understood that a lower pH may allow a higher water activity for preventing microbial outgrowth.

The ingredients are conveniently mixed in a kettle or the like. The water activity may be controlled by the addition of a humectant, e.g. low-lactose whey, sodium chloride, sweet dairy whey, glycerol, sorbitol, sucrose, potassium phosphate, milk powder or any mixture of two or more thereof. The ingredients may be mixed or precooked batchwise at a temperature below 160° F., preferably from 80° to 120° F. and more preferably from 85° to 98° C. The duration of the mixing or precooking after all the ingredients have been added may be as long as 60 minutes without detrimental effect on the product quality but is preferably less than 5 minutes, and more preferably from 0.5 to 2 minutes.

After mixing or precooking, the ingredients are processed. The processing temperature should be less than 190° F., preferably not higher than 180° F. and more preferably not higher than 170° F. since such temperatures could be detrimental to the colour, appearance and organoleptic quality of the sauce. The ingredients are advantageously pumped through the processing steps and finally to a filler. The pumping means is conveniently a positive displacement pump. The processing of the ingredients by continuous steam injection may be carried out, for instance, by pumping the ingredients to a steam injector where the injected steam controlled by a steam valve brings the product to a temperature of at least 160° F. but preferably less than 190° F. since higher temperatures would be detrimental to the organoleptic quality of the sauce.

The steam injector may be provided with a coating of an insulating material on the product contact surfaces, such as Teflon. Advantageously, the steam injector tube may be made entirely from an insulating material such as Teflon. This insulation is especially useful for product formulations which are so heat or moisture sensitive that they are not usually processable by steam injection because they are susceptible to product sticking or "burn-on", e.g. pesto sauce or Alfredo sauce. Alternatively, the product contact surfaces of the steam injector made of stainless steel may be ultra polished ("mirror finished") to provide a surface less susceptible to product burn on. Another possibility is the use of multiple steam injectors in parallel with suitable isolation valves to enable switching the process over to a clean injector while another is offline for cleaning. Through steam injection processing it is advantageous to use a static mixer insert to facilitate steam/product mixing and dispersion/break-up of steam bubbles thereby improving the distribution and consistency of processing. Additionally, it is advantageous to insure the system is under constant pressure which is created by the pump and influenced by the temperature of processing, product rheology and the piping configuration of the system. A backpressure control valve may be used to aid control.

After the steam injection, the product is processed at a minimum temperature of 160° F. by passing through a jacketed process pipe line with hot water circulating through the wall to maintain the desired temperature of the product. After processing, the product is advantageously conveyed directly to the filler. The maximum processing time of the product after cooking is preferably less than 2 minutes and more preferably less than 1.5 minutes. The pump speed is adapted to enable the product to pass through the steam injector and holding means at a predetermined rate. If the rate of flow is too high, there is a greater induced stress on the product which leads to a greater level of emulsification and other rheological impacts on the product.

Preferably, means are provided to prevent product below 160° F. from entering the jacketed process pipe line and from entering the filler. The means may be provided by temperature transmitters positioned upstream of the jacketed pipe line and the filler which sense the temperature and send a signal to divert valves. If the temperature of the product recorded by the temperature transmitter is below 160° F. after exiting the steam injector or after exiting the jacketed pipe line, the product will be diverted back to the kettle for rework. Advantageously, means are also provided to control the process temperature whereby the signal from a temperature transmitter upstream of the jacketed process pipe line controls the position of the steam valve of the steam injector via a computer.

The present invention also provides a culinary sauce containing an amount of fat reduced by from 10 to 50% and preferably from 20 to 35% by weight of the fat present in the corresponding regular culinary sauce.

Examples of reduced fat culinary sauces are pesto sauce, Alfredo sauce, salsa sauce, low fat dairy/cream based sauces. The pesto sauce preferably has a fat content of from 18 to 35% by weight. The processing method is also beneficial for sauces with a high level of particulates not requiring high thermal processing and with high temperature sensitivity, e.g. sauces where crunchy vegetables would be desired such as garden vegetables or Primavera sauce.

The present invention further provides an apparatus for the manufacture of a reduced fat culinary sauce which comprises
   means for mixing or precooking the ingredients,
   a pump for pumping the cooked ingredients to a filler at a predetermined rate,
   a steam injector adapted to heat the product to at least 160° F.,
   a processing pipe maintained at a temperature of at least 160° F.,
   a filler,
and means for preventing product below 160° F. from entering the jacketed process pipe line and from entering the filler.

The means for mixing or precooking the ingredients may be the same and may conveniently be a kettle. The pump is preferably a positive displacement pump.

The steam injector may be provided with an insulating coating on the product contact surfaces, or may be made entirely from an insulating material, e.g. Teflon.

The processing pipe may be maintained at a temperature of at least 160° F. by a jacketed wall through which water flows at a temperature of at least 160° F.

The means for preventing product below 160° F. from entering the jacketed process pipe line and from entering the filler may be provided by divert valves and temperature transmitters positioned upstream of the jacketed pipe line and the filler which sense the temperature and send a signal to the divert valves. If the temperature of the product recorded by the temperature transmitter is below 160° F. after exiting the steam injector or after exiting the jacketed pipe line, the product will be diverted back to the kettle for rework by the divert valves. The signal from the temperature transmitter may also be used to control process temperature via a computer which controls the position of the steam valve of the steam injector.

EXAMPLE

The following Example further illustrates the present invention.

A regular pesto sauce contains the following ingredients: basil, Parmesan cheese, olive oil, canola oil, low-lactose whey, spices, walnuts, butter, Romano cheese, pine nuts, salt, garlic puree, sugar and water. The total fat content is 39% and the moisture content is 30% and the water activity is 0.93–0.94. In combination with the thermal process, water activity in this range is restrictive to the outgrowth of spoilage and pathogenic microorganisms which may limit the shelf life of this product during refrigerated storage.

A reduced fat pesto sauce is prepared by using similar ingredients to those for the above regular pesto sauce except that no butter is added and less olive and canola oil is added so that the total fat content is 29%, the reduction in fat content being made up by water which is added to give a moisture content of 40%. An increased amount of low-lactose whey is added which together with the salt acts as a humectant to control the water activity to a value of 0.94–0.95. Microbiological challenge investigations demonstrated that reduced-fat pesto at or below this water activity range would restrict the outgrowth during refrigerated storage of spoilage or pathogenic organisms surviving the thermal process.

The process of manufacture of a reduced fat pesto sauce from mixing the ingredients to the filler will now be described with reference to FIG. 1 of the accompanying drawing. The reduced fat pesto ingredients are mixed or precooked in a kettle 10 for 1 minute at 95° F. The mixed or precooked ingredients are then pumped by a positive displacement pump 11 at a predetermined rate for processing to the filler (not shown) firstly through a steam injector 12 built by Pick Heaters Inc. Model SC-10LF comprising an injector tube made of Teflon and supplied with steam whose flow is controlled by a steam valve 13. The steam is fed to the interior of the injector tube and then through holes to the outside of the tube which is immersed in the cooked ingredients. The cooked ingredients are heated to 160° F. in the steam injector tube and then pumped downstream past a process temperature control transmitter 14 which senses the product temperature and sends a signal to a Programmable Logic Controller (PLC—not shown), a computer which controls the process events and which controls the position of the steam valve 13 for temperature control and also a divert valve 15 which diverts the product back to the kettle 10 for rework if the product temperature is below 160° F. The PLC has the ability of PID control—a control loop which includes Proportion, Integration and Derivative designed to maintain process conditions at set points. The product is further pumped downstream to a jacketed process pipe line 16 maintained at 160° F. by hot water flowing through the jacketed wall at 160° F. to maintain the product at 160° F. The product is further pumped downstream past a process temperature control transmitter 17 which senses the product temperature and sends a signal to a PLC (not shown) which controls a divert valve 18 which diverts the product back to the kettle 10 for rework if the product temperature is below 160° F. Finally the product is pumped to the filler, the time taken for the product to be conveyed from the kettle to the filler being 1 minute.

After filling into packages, the pesto sauce is refrigerated and has a very desirable green colour with excellent storage stability of a 50 day shelf life.

We claim:
1. A process for the production of a storage stable, reduced fat culinary sauce which comprises preparing a reduced fat culinary sauce having a fat content of between about 18 to 35 percent by weight by substituting part of the fat present in a regular culinary sauce with water, controlling the water activity of the sauce to a value less than 0.95; mixing or precooking the sauce below 160° F.; and then processing at a temperature of less than 190° F. for a minimum of 0.87 minutes by continuous steam injection followed by holding at a temperature of at least 160° F.

2. A process according to claim 1 wherein the amount of fat substituted by water is from 10 to 50% by weight of the fat present in the corresponding regular culinary sauce.

3. A process according to claim 1 wherein the water activity is controlled by the addition of a humectant.

4. A process according to claim 1 wherein the ingredients are mixed or precooked batchwise at a temperature from 80° to 120° F.

5. A process according to claim 1 wherein the duration of the mixing the precooking of the ingredients is from 0.5 to 60 minutes.

6. A process according to claim 1 wherein, after mixing or precooking, the ingredients are pumped through the processing steps and finally to a filler.

7. A process according to claim 1 wherein the processing of the ingredients by continuous steam injection is carried out by pumping the ingredients to a steam injector where the injected steam controlled by a steam valve brings the product to a temperature of at least 160° F.

8. A process according to claim 7 wherein the steam injector is provided with an insulating coating on the product contact surfaces or the steam injector tube is made entirely from an insulating material.

9. A process according to claim 8 wherein the insulating material is Teflon.

10. A process according to claim 1 wherein, after the steam injection, the product is processed at a minimum temperature of 160° F. by passing through a jacketed process pipe line with hot water circulating through the wall to maintain the desired temperature of the product.

11. A process according to claim 1 wherein, after processing, the product is conveyed directly to the filler whereby the maximum processing time of the product after mixing or precooking is less than 2 minutes.

12. A process according to claim 1 wherein means are provided to prevent product below 160° F. from entering the jacketed process pipe line and from entering the filler.

13. A process according to claim 12 wherein the means is provided by temperature transmitters positioned upstream of the jacketed pipe line and the filler which sense the temperature and send a signal to divert valves so that if the temperature of the product recorded by the temperature transmitter is below 160° F. after exiting the steam injector or after exiting the jacketed pipe line, the product will be diverted back to the kettle for rework.

14. A process according to claim 1 wherein means are provided to control the process temperature whereby the signal from a temperature transmitter upstream of the jacketed process pipe line controls the position of the steam valve of the steam injector.

* * * * *